United States Patent
Bilstad et al.

(10) Patent No.: US 10,349,368 B2
(45) Date of Patent: *Jul. 9, 2019

(54) REFERENCE SYNCHRONISATION

(71) Applicant: Imagination Technologies Limited, Kings Langley (GB)

(72) Inventors: Arnold Mark Bilstad, Los Altos, CA (US); Jose Juan Fernández Dios, Watford (GB); Paul Matthew Blay, Milton Keynes (GB)

(73) Assignee: Imagination Technologies Limited, Kings Langley (GB)

( * ) Notice: Subject to any disclaimer, the term of this patent is extended or adjusted under 35 U.S.C. 154(b) by 22 days.

This patent is subject to a terminal disclaimer.

(21) Appl. No.: 15/638,591

(22) Filed: Jun. 30, 2017

(65) Prior Publication Data

US 2018/0007647 A1   Jan. 4, 2018

Related U.S. Application Data

(60) Provisional application No. 62/356,669, filed on Jun. 30, 2016.

(51) Int. Cl.
*H04J 3/06* (2006.01)
*H04W 56/00* (2009.01)
(Continued)

(52) U.S. Cl.
CPC ....... *H04W 56/0015* (2013.01); *H04J 3/0661* (2013.01); *H04J 3/0682* (2013.01);
(Continued)

(58) Field of Classification Search
CPC .... H04B 7/2662; H04J 3/0632; H04J 3/0638; H04J 3/065; H04J 3/0655; H04J 3/0661;
(Continued)

(56) References Cited

U.S. PATENT DOCUMENTS 7,539,889 B2 * 5/2009 Celinski ............... G06F 1/12
713/400
8,279,896 B2 * 10/2012 Etkin ..................... H04L 43/00
370/503
(Continued)

FOREIGN PATENT DOCUMENTS

GB   2494949 A   3/2013

OTHER PUBLICATIONS

Stanton, "802.1AS Tutorial," 802.1 AVB TG, Nov. 2008, pp. 1-42.

*Primary Examiner* — Frank Duong
(74) *Attorney, Agent, or Firm* — Vorys, Sater, Seymour and Pease LLP; Vincent M DeLuca

(57) ABSTRACT

A method at a first device for synchronising a first clock of the first device to a second clock of a second device, includes receiving a first message comprising an identifier from a third device; generating a first timestamp in dependence on the time at which the first message is received at the first device according to the first clock; receiving a second message from the second device comprising the identifier and a second timestamp, the second timestamp having been generated in dependence on the time at which the second device received the first message from the third device according to the second clock; and adjusting the first clock in dependence on a time difference between a time indicated by the first timestamp and a time indicated by the second timestamp.

20 Claims, 6 Drawing Sheets

(51) Int. Cl.
*H04L 7/00* (2006.01)
*H04N 21/00* (2011.01)
*H04L 29/06* (2006.01)
*H04N 21/43* (2011.01)
*H04N 21/8547* (2011.01)
*H04W 4/70* (2018.01)

(52) U.S. Cl.
CPC ............ *H04L 7/0012* (2013.01); *H04L 69/00* (2013.01); *H04N 21/00* (2013.01); *H04N 21/4302* (2013.01); *H04N 21/8547* (2013.01); *H04W 56/001* (2013.01); *H04W 4/70* (2018.02); *H04W 56/005* (2013.01)

(58) Field of Classification Search
CPC ................... H04J 3/0682; H04J 3/0685; H04J 2011/0096; H04L 7/0012; H04N 21/4302; H04N 21/8547; H04W 4/005; H04W 4/70; H04W 56/001; H04W 56/0015; H04W 56/0045; H04W 56/005; H04W 56/0085
See application file for complete search history.

(56) References Cited

U.S. PATENT DOCUMENTS

| | | | |
|---|---|---|---|
| 9,693,325 B1* | 6/2017 | Park | H04W 56/0005 |
| 10,034,255 B2* | 7/2018 | Ranasinghe | H04J 3/0667 |
| 10,165,534 B2* | 12/2018 | Bilstad | H04L 7/0012 |
| 2012/0188997 A1* | 7/2012 | Zakrzewski | H04J 3/0667 370/350 |
| 2014/0204930 A1* | 7/2014 | Knowles | H04W 56/001 370/338 |

\* cited by examiner

REFERENCE SYNCHRONISATION

BACKGROUND

This invention relates to synchronising devices.

Time synchronisation in computer and communication systems is important for performing time-sensitive tasks. A lack of synchronisation between devices may lead to various problems. For example, in a wireless media system, a lack of synchronisation between different media playout devices (e.g. speakers) in the system may cause playback of the media to be out-of-sync. Other time-sensitive tasks where accurate synchronisation is critical include synchronising times for communicating (e.g. in time division multiple access communication systems), accurate time-stamping (e.g. for high-frequency trading), timing for global navigation satellite systems, etc.

A lack of synchronisation between devices may be caused by slight differences between clocks running at those devices. Even when clocks are initially set accurately, they will differ after some amount of time due to clock drift, which may be caused by, for example, the clocks counting time at slightly different rates, environmental factors such as temperature differences, relativistic effects, etc. There is, therefore, a need to synchronise different devices and maintain synchronisation of the devices over time.

SUMMARY

A method at a first device for synchronising a first clock of the first device to a second clock of a second device, the method comprising:
   receiving a first message comprising an identifier from a third device;
   generating a first timestamp in dependence on the time at which the first message is received at the first device according to the first clock;
   receiving a second message from the second device comprising the identifier and a second timestamp, the second timestamp having been generated in dependence on the time at which the second device received the first message from the third device according to the second clock; and
   adjusting the first clock in dependence on a time difference between a time indicated by the first timestamp and a time indicated by the second timestamp.

The method may further comprise the steps of:
   receiving a plurality of identifiers and storing each of the identifiers in memory;
   for each of the plurality of identifiers, storing in memory an associated timestamp indicating a time at which that identifier was received at the first device according to the first clock;
   in response to receiving the second message, searching the memory so as to identify a stored identifier that corresponds to the identifier in the second message and retrieving a timestamp stored in association with the stored identifier, wherein the retrieved timestamp is the first timestamp.

The first message may be broadcasted by the third device.

The first and second clocks may be clocks for timing of media playback.

The method may further comprise:
   receiving media and a media playback time from the second device; and
   playing out the media in dependence on the media playback time according to the adjusted first clock.

The media may be received via the third device.

According to a second aspect there is provided a method, at a first device comprising a first clock, of enabling synchronisation of a second clock at a second device with the first clock, the method comprising:
   receiving a first message comprising an identifier from a third device;
   generating a timestamp in dependence on the time at which the first message is received at the first device according to the first clock;
   generating a second message comprising the identifier and the generated timestamp; and
   transmitting the second message to the second device.

The method may further comprise:
   determining a playback time for playing media in dependence on a time according to the first clock and an offset period of time; and
   transmitting the determined playback time to the second device.

The playback time may be transmitted to the second device via the third device.

The second message may be transmitted to the second device via the third device.

The identifier may be generated in dependence on a third clock at the third device.

The first clock may be configured to operate to a first clock resolution and the third clock is configured to operate to a second resolution lower than the first resolution.

The third clock may be a wireless interface clock for timing of wireless communications.

The third device may be an access point.

The first device may be configured to operate according to a WLAN standard and the identifier is a timing synchronisation function.

The first device may be a wireless speaker.

According to a third aspect there is provided a first device for synchronising a first clock of the first device to a second clock of a second device, the first device comprising:
   the first clock;
   a communications interface configured to:
      receive a first message comprising an identifier from a third device and generate a first timestamp in dependence on the time at which the first message is received at the first device according to the first clock; and
      receive a second message from the second device comprising the identifier and a second timestamp, the second timestamp having been generated in dependence on a time at which the second device received the first message from the third device according to the second clock; and
   a controller configured to adjust the first clock in dependence on a time difference between a time indicated by the first timestamp and a time indicated by the second timestamp.

The communications interface may be further configured to receive a plurality of identifiers, the first device further comprising memory configured to store:
   each of the identifiers; and
   for each of the plurality of identifiers, an associated timestamp indicating a time at which that identifier was received at the first device according to the first clock, wherein the controller is further configured to, in response to receiving the second message, search the memory so as to identify a stored identifier that corresponds to the identifier in the second message and retrieve a timestamp stored in association with the stored identifier, wherein the retrieved timestamp is the first timestamp.

The first message may be a broadcast message.

The first clock may be a clock for timing of media playback.

The communications interface may be further configured to receive media and a media playback time from the second device, the first device further comprising a media player configured to play out the media in dependence on the media playback time according to the adjusted first clock.

The communications interface may be configured to receive the media via the third device.

According to a fourth aspect there is provided a first device comprising a first clock, the first device for enabling synchronisation of a second clock at a second device with the first clock, the first device comprising:

a communications interface configured to receive a first message comprising an identifier from a third device and generate a timestamp in dependence on the time at which the first message is received at the first device according to the first clock; and a controller configured to generate, at the first device, a second message comprising the identifier and the generated timestamp, wherein the communications interface is further configured to transmit the second message to the second device.

The controller may be further configured to determine a playback time for playing media in dependence on a time according to the first clock and an offset period of time; and the communications interface may be further configured to transmit the determined playback time to the second device.

The communications interface may be configured to transmit the playback time to the second device via the third device.

The communications interface may be configured to transmit the second message to the second device via the third device.

The identifier may be generated in dependence on a third clock at the third device.

The first clock may be configured to operate to a first clock resolution which is higher than the resolution of the third clock.

The third clock may be a wireless interface clock for timing of wireless communications.

The third device may be an access point.

The first device may be configured to operate according to a WLAN standard and the identifier is a timing synchronisation function.

The first device may be a wireless speaker.

According to a fifth aspect there is provided a system comprising a master device, a slave device and a third device, wherein the master device comprises:

a first clock;

a first communications interface configured to receive a first message comprising an identifier from the third device and generate a first timestamp in dependence on the time at which the first message is received at the master device according to the first clock; and a first controller configured to generate a second message comprising the identifier and the generated first timestamp, wherein the communications interface is further configured to transmit the second message to the slave device, wherein the slave device comprises:

a second clock;

a second communication interface configured to:

receive the first message comprising the identifier from the third device and generate a second timestamp in dependence on the time at which the first message is received at the slave device according to the second clock; and receive the second message from the master device; and a second controller configured to adjust the second clock in dependence on a time difference between a time indicated by the first timestamp and a time indicated by the second timestamp.

The first device may be embodied in hardware on an integrated circuit.

According to a sixth aspect there is provided a method of manufacturing the first device at an integrated circuit manufacturing system.

According to a seventh aspect there is provided a non-transitory computer readable storage medium having stored thereon a computer readable description of an integrated circuit that, when processed in an integrated circuit manufacturing system, causes the integrated circuit manufacturing system to manufacture the first device.

According to an eighth aspect there is provided an integrated circuit manufacturing system comprising:

a non-transitory computer readable storage medium having stored thereon a computer readable integrated circuit description that describes the first device;

a layout processing system configured to process the integrated circuit description so as to generate a circuit layout description of an integrated circuit embodying the device; and an integrated circuit generation system configured to manufacture the device according to the circuit layout description.

According to a ninth aspect there is provided a non-transitory computer readable storage medium having stored thereon computer readable instructions that, when executed at a computer system, cause the computer system to perform a method as described herein.

BRIEF DESCRIPTION OF THE DRAWINGS

The present invention will now be described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

The term "Wi-Fi network" is used herein to mean a wireless local area network that is based on the Institute of Electrical and Electronics Engineers (IEEE) 802.11 standards. The term "Wi-Fi™ station" (STA) is used herein to mean an electronic device that has a Wi-Fi™ module that allows the device to exchange data wirelessly using the IEEE 802.11 standards. The term "Wi-Fi™ access point" (AP) is used herein to mean an electronic device that acts as a central transmitter and receiver of W-Fi™ signals as set out in the IEEE 802.11 standards.

The methods, devices and systems are described herein as being implemented in a Wi-Fi network. It will be appreciated, however, that the methods, devices and systems may also be applied using other wired or wireless communications networks, such as Bluetooth, Ethernet, USB, Zigbee, LTE, I²S, S/PDIF, etc.

The present disclosure relates to synchronising devices. For example, a device may need to be synchronised with one or more other devices so that a specified event can occur at those devices at the same time. The examples described herein relate to synchronising media devices so that media (e.g. audio, video, etc) can be played in-sync at each of the media devices. It will be appreciated that the synchronisation method described in relation to the media devices may be applied to other types of devices (e.g. computers, communications devices, positioning devices, etc) for performing other time-critical tasks. For example, the method could be used for other non-media-related applications that require streaming data with a specific timing, such as a system with multiple direct digital synthesizers that control some process.

Figure 1:
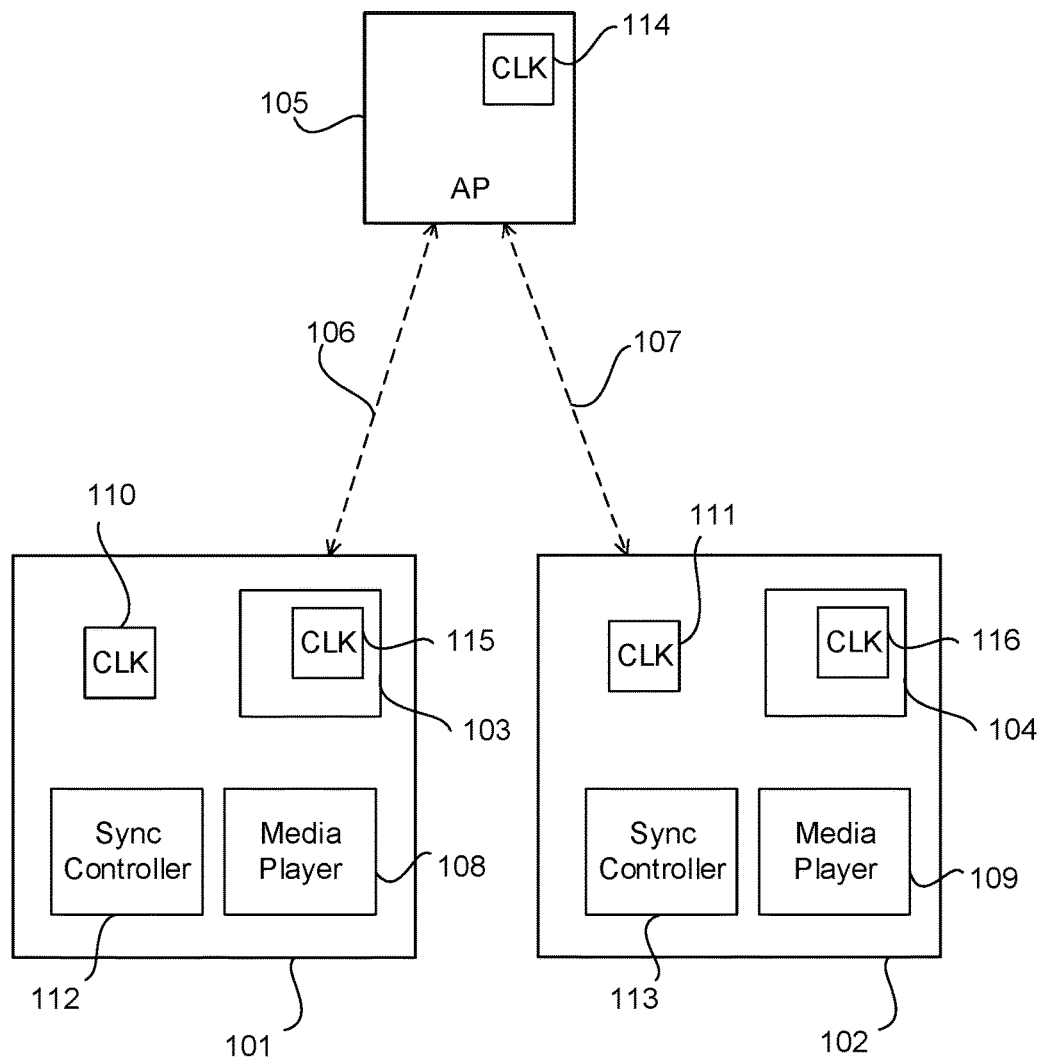
FIG. 1 shows a first example of a media system.

FIG. 1 depicts a media system 100 comprising media devices 101 and 102. Each of the media devices 101 and 102 comprise a communications interface 103 and 104 respectively for communicating data. In this example, communications interfaces 103 and 104 operate according to a Wi-Fi standard. However, the communications interfaces 103 and 104 could be any other suitable type of wired or wireless communications interface such as Bluetooth, Ethernet, USB, Zigbee, LTE, I²S, S/PDIF, etc. For simplicity, the media system 100 is shown and described as having two media devices. However, more than two media devices can be provided in the system.

In this example, devices 101 and 102 are STAs that communicate with each other via an AP 105. In this network arrangement, the communications interface 103 of device 101 establishes communications link 106 with AP 105 and the communication interface 104 of device 102 establishes communications link 107 with the AP 105. Communications links 106 and 107 may be unicast links. The devices 101 and 102 communicate with each other via the AP 105 and their respective communications links 106 and 107. For example, when device 101 sends data to device 102, the data is first sent, via link 106, to the AP 105, which then sends that data on to the device 102 via link 107. Thus, in this arrangement, devices 101 and 102 communicate with each other indirectly (via AP 105). A Wi-Fi network operating in this way is sometimes referred to as an "infrastructure" mode of operation. In this context, a message that is transmitted by device 101 to device 102 means that the message is transmitted by device 101 to device 102 via the AP 105. Similarly, a message that is received by device 102 from device 101 means that the message is received by device 102 from device 101 via AP 105 (i.e. the message received by device 102 originates from device 101).

Each media device 101 and 102 comprises (or is connected to) a media player 108 and 109 respectively for playing media. Each of the media players 108 and 109 may provide media to a media output (not shown) such as a speaker, display, vibration feedback motor, lights, etc for playing of the media. Each media player 108 and 109 may be connected to wireless communication interfaces 103 and 104 respectively to send/receive media for playback and/or receive instructions to play out certain media. The media players 108 and 109 may also receive media from other media sources (not shown) connected to the devices 101 and 102 respectively. The media devices 101 and 102 may be, for example, stand-alone speakers or displays or integrated into other devices such as smartphones, TVs, docking stations, Hi-Fis, smart watches, smart glasses, virtual reality headsets, etc. The AP 105 may be a standard Wi-Fi AP and is not required to have any media functionality (although it may do so).

Each device 101 and 102 comprises a clock 110 and 111 respectively that provides timing for media players 108 and 109 respectively. One of the devices 101 or 102 may be selected to be a master device and the other a slave device. In this example, device 101 is a master and device 102 is a slave. In media systems with more than two media devices in this network arrangement, one of the devices is the master device and the remaining devices are slave devices. The clock of the master device may be a clock that provides a root time source for the slave devices to synchronise to. In the example of FIG. 1, clock 110 of master device 101 is the root time source and clock 111 of slave device 102 is to be synchronised with clock 110.

The master device 101 may be the device in system 100 that also controls the performance of time-critical tasks, such as determining which media is to be played out by which device and a specified time for playing out that media. For example, the media player 108 of master device 101 may provide media to the media player 109 of slave device 102 (via the AP 105), for playback. The media player 108 may also determine a time for playing the media according to clock 110. The determined time may also be sent (via AP 105) to the media player 109 of the slave device 102. The media players 108 and 109 of the master and slave devices 101 and 102 respectively may then play out the media at the determined time according to their respective clocks 110 and 111. If, however, clocks 110 and 111 are out-of-sync, then the playback of the media will also be out-of-sync.

Each device 101 and 102 comprises a synchronisation controller 112 and 113 respectively for synchronising clocks 110 and 111 and maintaining their synchronisation. As device 101 is the master device, clock 110 may run freely without making any adjustments to it while clock 111 of slave device 102 is adjusted so that it is synchronised with clock 110. In some cases, some adjustments may be made to the master clock 110. For example, the master clock may be adjusted when the master device is a slave device for a different domain (as discussed further below). In another example, the master clock may be adjusted when the master device is synchronizing its clock to any other clock (e.g., an internet NTP server). In some media systems where the audio source pushes data to the master device at a different rate, the master device may adjust its clock based on an estimation of the source's data rate calculated from frame arrival times or buffer levels (e.g., when streaming over Bluetooth from a smartphone to the master device).

Figure 2A:
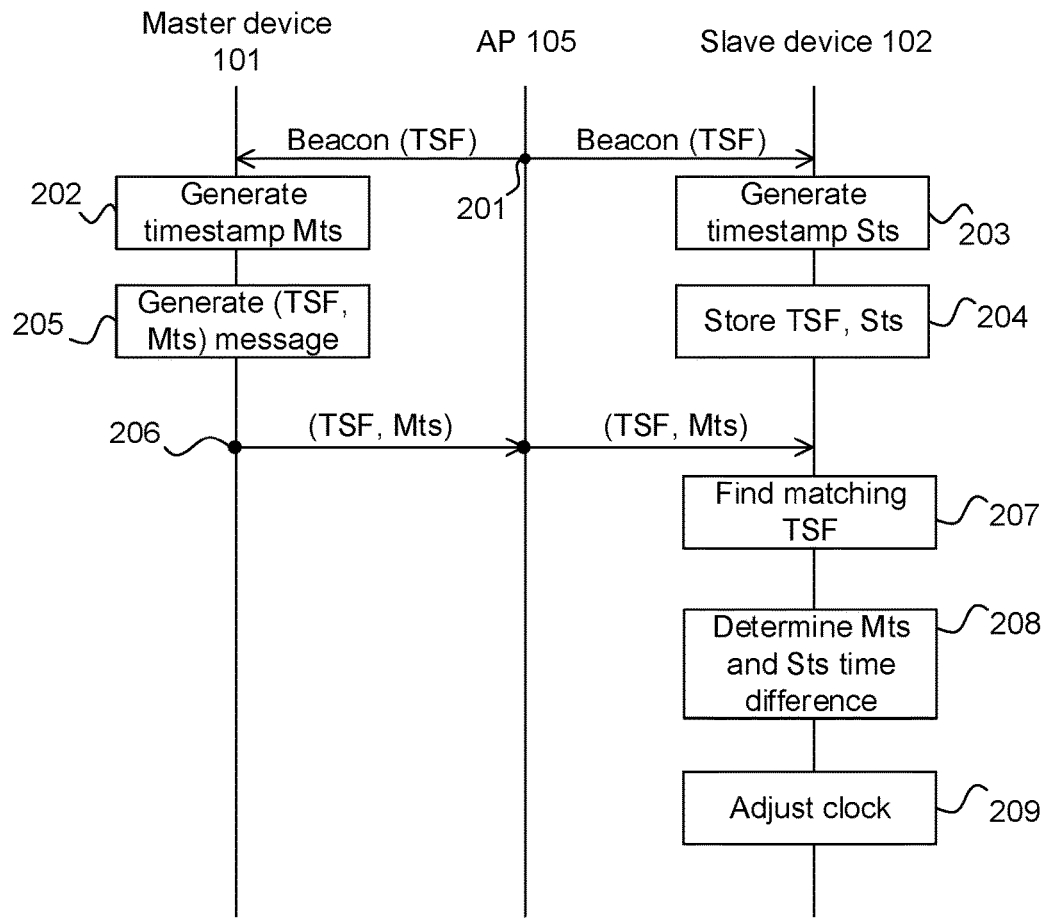
FIG. 2a illustrates a process for synchronising the clocks of the media system of FIG. 1.

FIG. 2a depicts a process for synchronising clock 111 of slave device 102 with clock 110 of master device 101 when devices 101 and 102 are operating in the network arrangement of FIG. 1.

At 201, the AP 105 broadcasts a message. In the example of FIG. 2a, the broadcast message is a beacon message, which is provided for in the Wi-Fi standard and is periodically broadcast by APs. The broadcasted message could be any message that is broadcast or multicast by the AP 105 and receivable by STAs within range of the AP 105.

The beacon is received by devices 101 and 102, as indicated at 202 and 203 respectively. Devices 101 and 102 receive the beacon directly from the AP 105 and so the beacon is received substantially simultaneously at both the devices 101 and 102.

At 202, the master device 101 generates a timestamp (Mts) indicating a time that the beacon was received according to clock 110. Similarly, at 203, slave device 102 also generates a timestamp (Sts) indicating a time that the beacon was received according to clock 111.

In alternative scenarios, instead of receiving a message from an AP, the master device and each slave device in the network could all observe a uniquely identifiable event and each device can generate a timestamp indicating a time that the event was observed according to its clock.

The timestamps Mts and Sts may be generated in a number of ways by the devices 101 and 102. Using device 101 as an example, the beacon (or an indication that the beacon has been received with an identifier for the beacon) may be provided to the synchronisation controller 112 by the communications interface 103 when the beacon has been received. Beacon messages are required to be processed by STAs as a priority and so the beacon can be provided to the synchronisation controller 112 with minimal delay. In response to the beacon being received by the synchronisation controller 112, it determines a time according to clock 110. The determined time is the timestamp that indicates the time of receiving the beacon according to clock 110. In another example, the communications interface 103 determines a time according to clock 110 in response to receiving the beacon. The communications interface 103 then provides the determined timestamp and identification information about the beacon (such as the TSF, as described further below) to the synchronisation controller 112. Preferably, the delay between the beacon arrival and the timestamp being provided to the synchronisation controller 112 is determined and used to compensate for any measurement error so that the timestamp represents the beacon arrival time accurately. Alternatively or additionally, both devices 101 and 102 could generate the timestamps in the same way (i.e. so both devices 101 and 102 have the same measurement error) so that any differences in the delay for determining the timestamps can be minimised. For example, all of the devices could be configured to generate timestamps in reference to the same reference point in the received messages.

The messages periodically broadcast by the AP 105 each contain a unique identifier so that each message can be distinguished from other broadcasted messages. In the example of broadcasting a beacon, the unique identifier may be a time synchronisation function (TSF). In the Wi-Fi standard, the TSF indicates a time on the physical layer clock of the AP, which the STAs are required to synchronise to at their own physical layer clocks. When an STA receives a beacon, it resets its own physical layer clock according to the TSF. In the example of FIG. 1, the physical layer clock of AP 105 is indicated at 114. The physical layer clocks of the communications interfaces 103 and 104 of devices 101 and 102 are indicated at 115 and 116 respectively. As the beacons are generated periodically, the value of the TSF will be different for each beacon. Thus the TSF value can also function as a unique identifier for each beacon. The use of the TSF in this way as an identifier is not defined in the Wi-Fi standard. The physical layer clocks usually form part of the communications interface and are different to clocks 110 and 111.

For each received beacon, the TSF value contained within that beacon is determined. The TSF value may be determined by the communications interface 103 or 104 or the synchronisation controller 112 or 113. In one example, each communications interface 103 and 104 may comprise an interface that determines the TSF and the arrival timestamp Mts or Sts (according to clocks 110 or 111) for a beacon and provides the TSF value and the determined timestamp to its synchronisation controller. The slave device 102 may store the timestamp Sts for receiving the beacon and the TSF value contained within the beacon in memory, as indicated at 204. The master device 101 may also store its timestamp Mts and the TSF in its memory (not shown).

At 205, the master device 101 generates a synchronisation message that comprises the identifier for the broadcasted message (i.e. the TSF of the received beacon, in this example) and the timestamp Mts indicating when the broadcasted message was received according to clock 110. The master device 101 transmits the generated synchronisation message comprising the TSF and Mts to the slave device 102 via the AP 105, as shown at 206. The slave device 102 receives the synchronisation message and provides it to the synchronisation controller 113.

At 207, the synchronisation controller 113 analyses the message to determine the value for the identifier and the timestamp. The synchronisation controller 113 searches the memory to find a stored identifier (TSF received from the AP 105) that matches the identifier (TSF received from master device 101) in the synchronisation message. As the master and slave devices 101 and 102 receive the same broadcasted beacon from the AP 105, the TSF value in the synchronisation message will also be stored in the slave device 102 memory along with the timestamp Sts.

At 208, the synchronisation controller 113 of the slave device 102 determines the difference in time between the received timestamp Mts and the stored timestamp Sts associated with the matching TSF identifier. At 209, the time on clock 111 is adjusted in accordance with the determined time difference so that clock 111 is synchronised with clock 110.

The synchronisation process of FIG. 2a may be performed periodically. For example, the process may be performed every time a beacon is transmitted by the AP 105 or the process could be performed for every $n^{th}$ beacon (where n is greater than one).

In the above example, the master device 102 may send the synchronisation message less frequently than the beacon broadcast. In other words, the synchronisation message may not be sent for every beacon that is received. In addition, if the wireless medium is busy, the transmission and reception of the synchronisation message may be delayed and by the time the synchronisation message is received at the slave device 102, further beacons (with later or greater TSF values than the TSF in the synchronisation message) may have been received at the slave device 102 prior to receiving the synchronisation message. Thus, the memory at the slave device may contain multiple TSF values that are less than or greater than the TSF value in the synchronisation message. Searching for the matching TSF value ensures that the slave device 102 uses a timestamp that was generated at the same time that the master device 101 generated its timestamp.

Once the synchronisation process of FIG. 2a has been completed, the master and slave devices 101 and 102 may then perform a subsequent process (shown in FIG. 2b) for playing media synchronously at those devices 101 and 102. The processes of FIGS. 2a and 2b may be performed independently.

The master device media player 108 may receive media data from a local device (e.g. memory) or network connection (e.g. RTP stream) and prepares it for playback on a local media playout device (e.g. a speaker). The media player 108 may also relay the media data, e.g., via the communications interface 103, to other devices in the network, such as device 102.

Figure 2B:
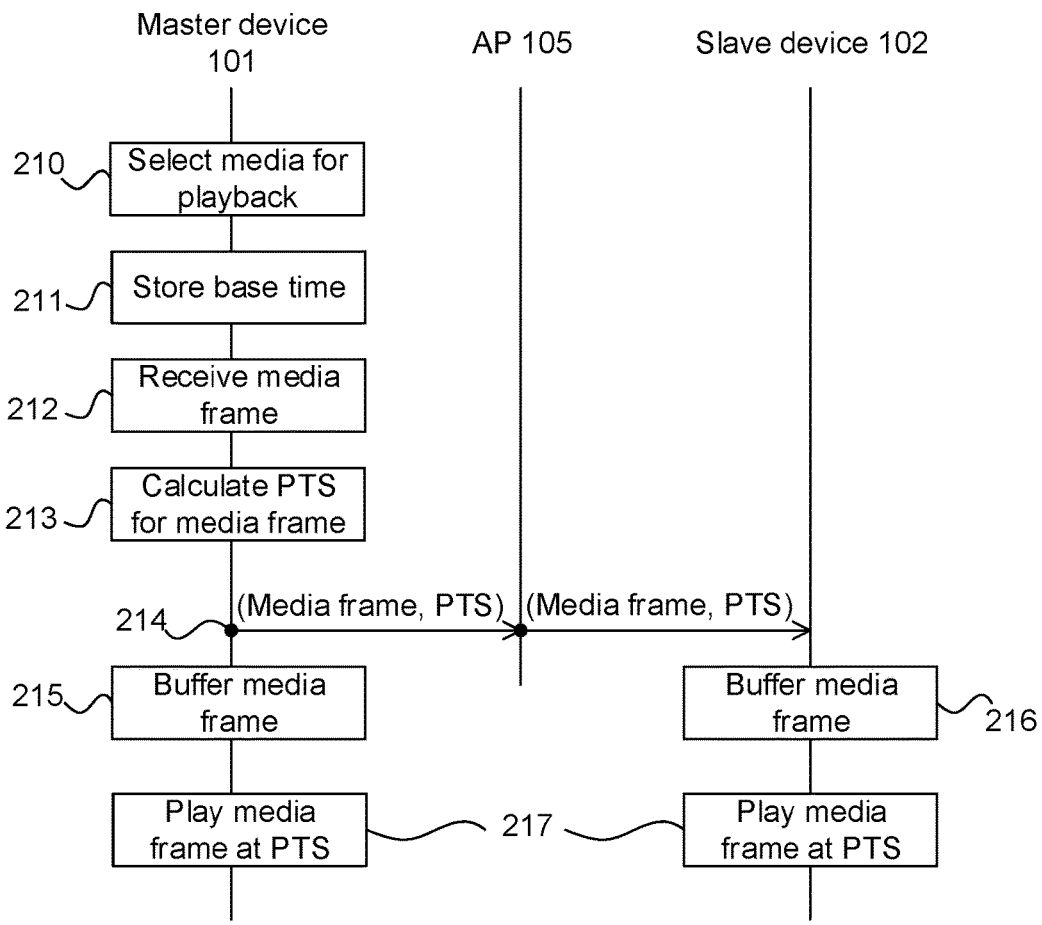
FIG. 2b illustrates a process for playing media at the media system.

FIG. 2b depicts a process for playing media in synchronisation at the master and slave devices 101 and 102. In this example, the media to be played out is a stream of media frames, which may have embedded timing information for each frame in the stream. The media stream may be a Real-time Transport Protocol (RTP) stream, for example.

At 210, media is selected for playing out at devices 101 and 102 in synchronisation. The media may be selected in response to, for example, a user input at the master device 101 or a remote device connected to the master device 101.

At 211, the master device media player 108 determines a current time according to clock 110. The determined time may be an absolute time that is stored and used as a base time reference for the media playback.

At 212, a media frame is received by the media player 108 for playing locally and sending to slave device 102 for playback at that device 102.

At 213, the media player 108 calculates a presentation timestamp (PTS), which is a time that the media frame, received at 212, is to be played out by the master and slave devices 101 and 102. The PTS may be calculated as follows:

$$PTS = base + reltime + delay$$

Where: "base" is the absolute base time determined and stored at step 211; "reltime" is the relative time position of the media frame within the media stream; and "delay" is a time offset into the future to allow time for the media to be distributed to all of the slave devices. The delay may be fixed or may be calculated at the beginning of each stream depending on environment factors like network reliability. For example, the delay may be calculated in dependence on the number of slave devices and/or the data transfer rate between the master device to the slave device (via the AP 105), etc. For example, the delay may range from tens of milliseconds to a few seconds but could be shorter or longer depending on the implementation.

At 214, the calculated PTS value is transmitted (via the AP 105) to the slave device 102 with the media that is to be played out at the PTS time. In one example, the PTS may be inserted into the RTP stream as it is relayed to the slave device 102. This may involve inserting the PTS into the RTP packet(s) for the relevant frame. In another example, the PTS may be sent in separate packets to the media with an indicator as to which frame the PTS is for.

At 215, the media frame and the PTS for the frame is also provided to a media buffer (not shown) at the master device 101 that buffers frames for playback by the master device 101 until the PTS time. The slave device 102 similarly provides its media buffer with the received media frame and PTS, as indicated at 216.

At 217, when the time according to clocks 110 and 111 of master and slave devices 101 and 102 respectively reach the PTS time, the media frame is played out by each of the devices 101 and 102. In some cases, each slave may adjust the PTS by subtracting its own pipeline delay so that the data reaches the speaker at exactly PTS time. As clocks 110 and 111 are in-sync following the process of FIG. 2a, the media will be played simultaneously.

Steps 212 to 217 may be repeated for each subsequent media frame in the media stream.

The media that is played out simultaneously by each device 101 and 102 may be different. The media player 108 of the master device 101 may provide a PTS value to a frame to be played out by the master device 101 and the same PTS value for a different frame to be sent to and played out by the slave device 102. For example, device 101 may play out frames for left channel audio whereas device 102 may playout frames for corresponding right channel audio. In another example, the master device 101 may be a display and the slave device 102 a speaker and the master 101 plays video frames and the slave 102 synchronously plays corresponding audio for the video.

In an example, media playout devices (not shown) at the master and/or slave devices 101 and 102 may use a clock or counter that has a timescale that is different to the timescale of clocks 110 and 111 respectively. In this case, the PTS and time according to clocks 110 and 111 may be converted to the timescale used by the media playout devices.

In some conventional applications, the TSF in the beacon broadcasted by APs is used as a time source when attempting to synchronise events at devices in a Wi-Fi network. Using the TSF in this way can be problematic as the TSF counter at the AP rolls back to a starting value (e.g. zero) when a maximum value has been reached. Such spontaneous resetting of the TSF value at the AP causes issues with STAs that are using the TSF value to adjust their own timers. Furthermore, AP clocks may be inaccurate and be based on a lower frequency clock which can lead to an increase in the jitter in the TSF time, poor audio clocking, and an increase in audio artefacts. In the examples described above in relation to FIGS. 1, 2a and 2b, the TSF generated by the AP is used to indicate the occurrence of an event rather than being used as a time source. Although the TSF counter can rollover, the chances of TSF values for two different beacons received over a relatively long time period being the same are very small and so the TSF value received can be considered to be a unique event identifier (at least locally) which is received at both master and slave devices 101 and 102 simultaneously.

As described above, the TSF as a unique identifier that can be used to synchronise clocks at the master and slave devices 101 and 102 without suffering from the issues faced by the conventional use of the TSF mentioned above. Furthermore, as the TSF is required to be transmitted by all APs to conform with the Wi-Fi standard, the master and slave devices 101 and 102 are able to perform the synchronisation operation with any AP that conforms to the Wi-Fi standard, irrespective of the AP vendor, thus aiding interoperability.

Figure 3:
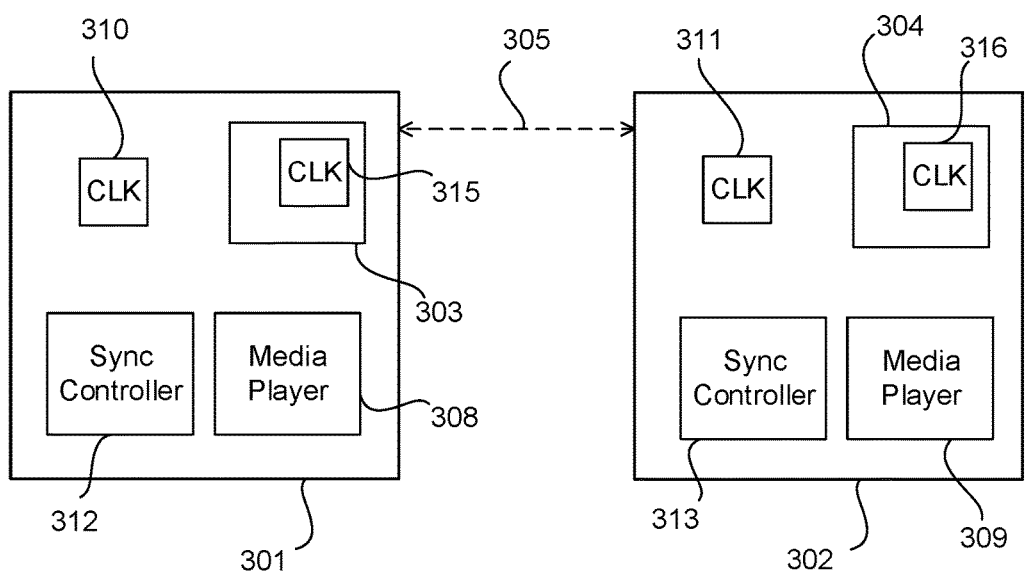
FIG. 3 shows a second example of a media system.

FIG. 3 shows another media system 300 comprising media devices 301 and 302. Each of the media devices 301 and 302 comprise a communications interface 303 and 304 respectively for communicating data. In this example, communications interfaces 303 and 304 operate according to a Wi-Fi standard. The communications interfaces 303 and 304 comprise physical layer clocks 315 and 316 respectively to provide timing for Wi-Fi communications.

One of the devices 301 or 302 may be considered to be a master device and the other a slave device. In this example, device 301 is the master and device 302 is the slave. In other arrangements, there may be one master device and more than one slave device in the media system.

In this example system, the master device 301 may also be the AP for the system or may be an STA that operates as a software enabled access point (softAP) when the master device 301 creates its own infrastructure (e.g., when the system operates in a Wi-Fi Direct mode). In the case of a Wi-Fi mesh network, the master device 301 may be the mesh point that sets the mesh time and the slave device 302 may be a mesh point that synchronises its time with mesh time. When operating as a softAP (or a mesh AP), master device 301 can connect to another AP (not shown) to enable data to be sent to and from system 300. In this network arrangement, the communications interfaces 303 and 304 establish a direct communications link 305 with each other. In this context, messages are directly transmitted and directly received between devices 301 and 302 and not via another device (such as an AP).

Each media device 301 and 302 comprises (or is connected to) a media player 308 and 309 respectively for playing media, similarly to the devices 101 and 102 and media players 108 and 109 described above. As above, each device 301 and 302 comprises a clock 310 and 311 respectively that provides timing for media players 308 and 309 respectively. The master device clock 310 may be the clock that provides a root time source for the slave devices to synchronise to. In the example of FIG. 3, clock 310 of master device 301 is the root time source and clock 311 of slave device 302 is to be synchronised with clock 310. The system 300 may comprise further slave devices (not shown) that also synchronise their clocks to the master device clock 310.

Each device 301 and 302 comprises a synchronisation controller 312 and 313 respectively for synchronising clocks 310 and 311 and maintaining their synchronisation. As device 301 is the master device, clock 310 may run freely without making any adjustments to it while clock 311 of slave device 302 is adjusted so that it is synchronised with clock 310.

Figure 4:
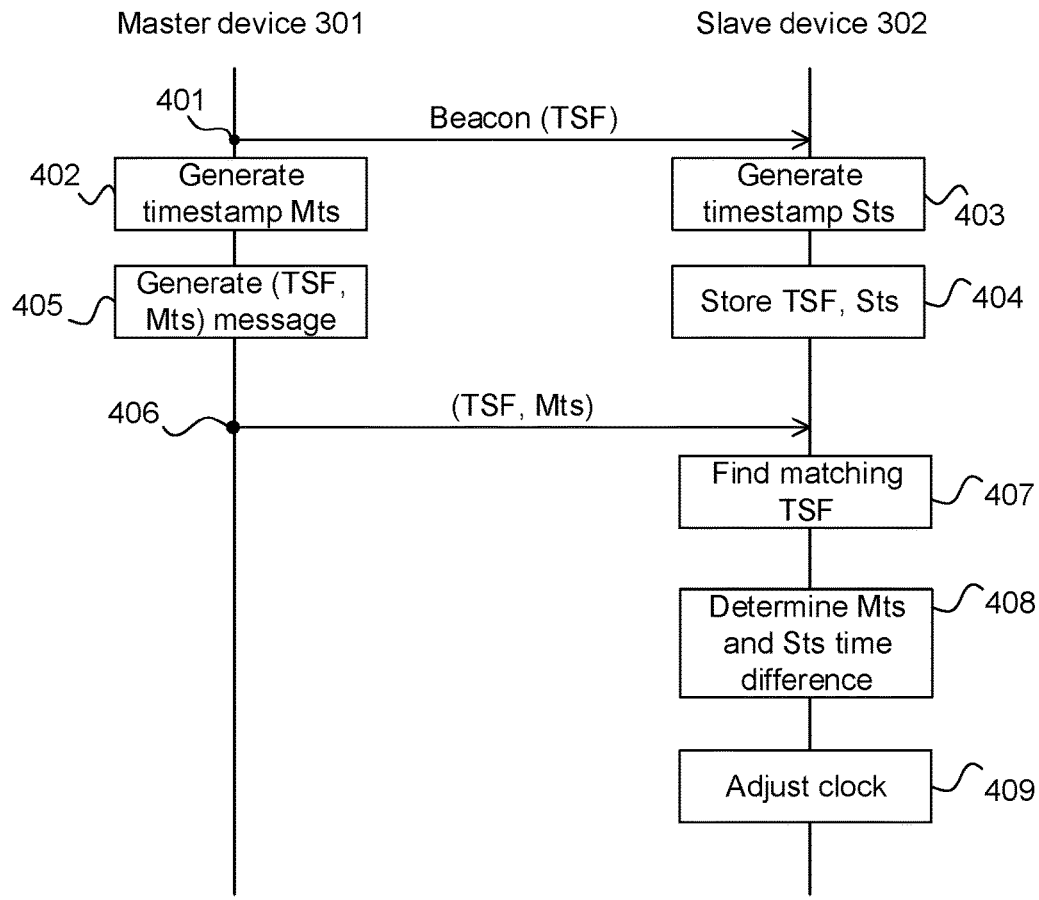
FIG. 4 illustrates a process for synchronising the clocks of the media system of FIG. 3.

FIG. 4 depicts a process for synchronising clock 311 of slave device 302 with clock 310 of master device 301 when devices 301 and 302 are operating in the network arrangement of FIG. 3.

At 401, the master device 301 transmits a message that comprises an identifier. In this example, master device 301 is an AP or is operating as a softAP and so the message may be a beacon message and the identifier may be a TSF value which has been derived from the physical layer clock 315 of the Wi-Fi communications interface 303. The beacon is periodically generated and broadcasted by the communications interface 303. In another example, the message may be any other message comprising an identifier (preferably, a unique identifier) that is transmitted by the master device 301 and receivable by the slave device 302. Such a message may be transmitted over a unicast link to device 302. In a system that has multiple slave devices, the message may be a broadcast or multicast message that is receivable by all of the slave devices within direct communications range of the master device 301 at the same time.

At 402, the master device 301 generates a timestamp Mts indicating a time that the beacon was transmitted according to clock 310. This timestamp may be generated in a number of ways by the device 301. In one example, the communications interface 303 may comprise an interface that determines the timestamp Mts when the beacon is transmitted and the TSF value contained within that beacon. The interface may then provide the determined timestamp and TSF value to synchronisation controller 312. In another example, the communications interface 303 may provide a copy of the beacon (or an indication that the beacon has been transmitted and the TSF value for the beacon) to the synchronisation controller 312 when the beacon has been transmitted. In response, the synchronisation controller 312 determines a time according to clock 310. The determined time is the timestamp that indicates the time that the master device 301 transmitted the beacon according to clock 310.

The slave device 302 receives the beacon and, at 403, generates a timestamp Sts indicating a time that the beacon was received according to clock 311. The slave device 302 may generate the timestamp Sts in a similar manner to that described above in relation to slave device 102 at step 203. The timestamp Sts for receiving the beacon and the TSF value contained within the beacon are stored in memory at the slave device 302, as indicated at 404.

At 405, the master device 301 generates a synchronisation message that comprises the TSF for the beacon transmitted at 401 and the timestamp Mts generated at 402. The synchronisation message is directly transmitted to the slave device 302, as shown at 406. Alternatively, the master device 301 may embed the TSF and Mts information in a subsequent beacon message, rather than transmitting the synchronization message. In response to receiving the synchronisation message, the slave device 302 may acknowledge receipt (not shown in FIG. 4) of the synchronisation message to the master device 301. This allows the master device 301 to determine that the slave device 302 has received the synchronisation message and so the clock 311 of the slave device 302 will be synchronised with the master device clock 310.

The slave device 302 receives the synchronisation message. At 407, the synchronisation controller 313 analyses the message to determine the TSF value and the timestamp value. The synchronisation controller 313 searches its memory to find a stored TSF value (which was the TSF sent in the beacon at 401) that matches the TSF value in the received synchronisation message. At 408, when the matching TSF value has been found, the synchronisation controller 313 determines the difference in time (or time error) between the received timestamp Mts and the stored timestamp Sts associated with the matching stored TSF. At 409, the time on clock 311 is adjusted in accordance with the determined time difference so that clock 311 is synchronised with clock 310. For example, the time error could be fed into a suitable PLL which can adjust clock 311 in dependence on the error to bring it into synchronisation with clock 310.

Once clocks 310 and 311 of the master and slave devices 301 and 302, respectively, have been synchronised, a process for playing media synchronously may be performed by devices 301 and 302. This process may be a similar process to that of the process described above in relation to FIG. 2b. However, in this network arrangement, the media and PTS is sent directly from the master device 301 to the slave device 302 rather than indirectly via an AP. In this case, the delay used to calculate the PTS can be shorter than the delay used in the system of FIG. 1 as it may take less time for the media data to be sent to the slave device 302 as an AP is not required to relay that data. Thus, the media system 300 arrangement of FIG. 3 can provide an improvement in the latency in playing media over the media system 100 of FIG. 1.

In the FIG. 1 example above, device 101 uses the time according to clock 110 as a time reference for playing media. Device 102 adjusts its clock 111 to be in sync with clock 110 so that the same time reference can be used as device 101 for playing media. Thus, devices 101 and 102 could be considered to be in the same time "domain". Similarly, devices 301 and 302 of FIG. 3 can also be considered to be in the same time domain.

Figure 5:
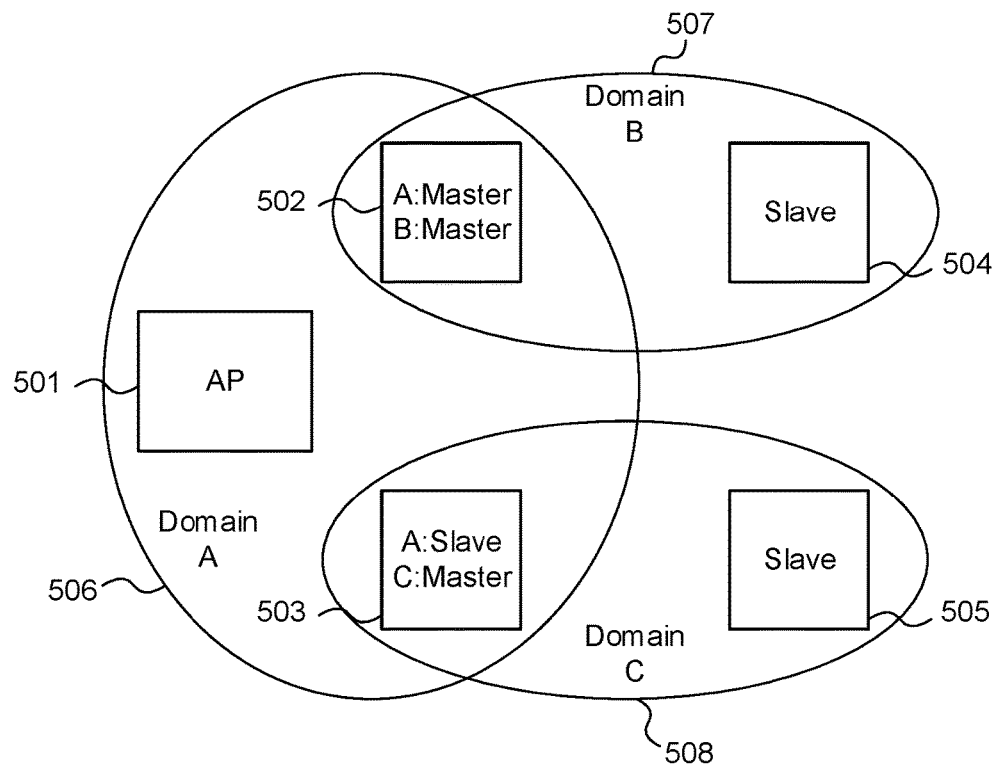
FIG. 5 shows a third example of a media system.

FIG. 5 shows a media system 500 comprising an AP 501 and media devices 502, 503, 504 and 505. The AP 501 and media devices 502-505 may operate in a similar manner to the AP 105 and media devices 101, 102, 301, 302 described above. This example system 500 illustrates how the synchronisation methods described above enables cascading of speakers in different domains. Devices 502 and 503 may be considered to be in domain A, devices 502 and 504 in domain B and devices 503 and 505 in domain C.

When operating as a master, a device may assume its local clock is the master clock of the domain and that other devices in the domain are slaves and will adjust their clock to be in sync with the master clock. For example, in domain B, device 502 is the master device and device 504 is the slave device. Device 502 also operates as a softAP in a Wi-Fi direct connection with device 504. Device 504 may synchronise its clock with the clock of device 502 using the process described above in relation to FIGS. 3 and 4.

In domain A, device 502 is the master device and device 503 is the slave device. In this domain, both devices 502 and 503 operate as STAs for this network and communicate via AP 501. Thus, devices 502 and 503 use the process described above in relation to FIGS. 1 and 2a to synchronise their clocks.

In domain C, device 503 is the master and device 505 is the slave. Device 503 also operates as the softAP in a Wi-Fi direct connection with device 505. Thus, device 503 is capable of operating as a master in one domain (domain C) and a slave in another domain (domain A). In this case, the clock of device 503 is adjusted to be in sync with device 502 via domain A. The adjusted clock is then used as the master clock for domain C and devices 503 and 505 use the process described above in relation to FIGS. 3 and 4 to synchronise their clocks. Thus, it is possible for all four devices 502-505 to have their clocks synchronised even though they operate in different domains and not all devices are directly receiving beacons or timestamps from the same device.

In the example described above, device 502 operates in the infrastructure mode in domain A and in the Wi-Fi direct mode in domain B. Similarly, device 503 operates in the infrastructure mode in domain A and in the Wi-Fi direct mode in domain C. The devices 502 and 503 may operate in the two different modes using a single Wi-Fi communications interface which appropriately switches between the modes. Alternatively, devices 502 and/or 503 may be provided with two different communications interfaces for operating in different domains. For example, device 502 may be provided with a Wi-Fi interface for operating in domain A and a wired interface (e.g. a wired interface which uses similar packetisation and management frames to Wi-Fi) for operating in domain B.

This synchronisation across domains enables media to be played synchronously across multiple domains and also means that media may be provided from any domain. Additionally, reconfiguration of the media system is quicker and easier as devices which are moved from one domain to another domain may not need to re-synchronize themselves to the time in the new domain as they will already be synchronised.

Clocks 110, 111, 310 and 311 may be implemented in software or hardware. For example, if the clocks are provided from a phase locked loop (PLL), then clocks 111 and 311 may be adjusted by appropriately tuning the PLL. In another example, the signal from clocks 111 and 311 provided to the respective media players 109 and 309 may be adjusted (rather than the clock itself).

Preferably, the time provided by clocks 110, 111, 310 and 311 represents an absolute time (e.g. in nanoseconds). The epoch of the time may be undefined in the sense that it may bear no resemblance to recognised calendar epochs such as Coordinated Universal Time (UTC). The epoch may also change after the devices have been power-cycled. For example, the time provided by clocks 110, 111, 310 and 311 may be implemented as the number of nanoseconds since the master device was powered-up. In this case, all devices in the system must share the same timescale and epoch. For example, providing synchronised absolute time values on all media device clocks allows media to be embedded with an absolute presentation time value, which results in the media devices to play the media synchronously.

The devices of FIGS. 1-6 are shown as comprising a number of functional blocks. This is schematic only and is not intended to define a strict division between different logic elements of such entities. Each functional block may be provided in any suitable manner. It is to be understood that intermediate values described herein as being formed by a device need not be physically generated by the device at any point and may merely represent logical values which conveniently describe the processing performed by the device between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a device configured to perform any of the methods described herein, or to manufacture a device comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a device will now be described with respect to FIG. 6.

Figure 6:
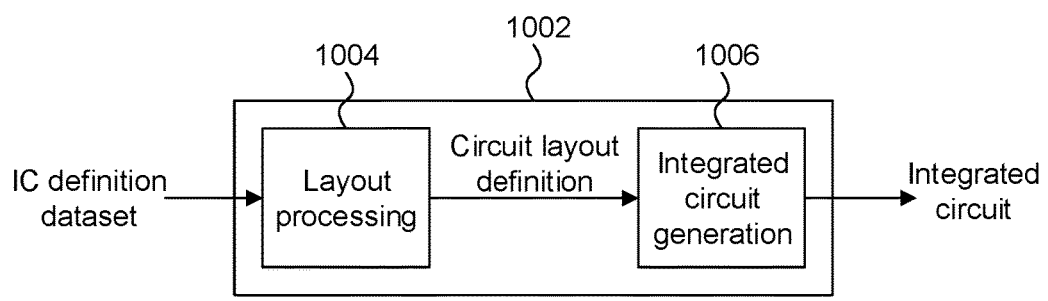
FIG. 6 is a schematic diagram of an integrated circuit manufacturing system.

FIG. 6 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a device as described in any of the examples herein), process the IC definition dataset, and generate an IC according to the IC definition dataset (e.g. which embodies a device as described in any of the examples herein). The processing of the IC definition dataset configures the IC manufacturing system 1002 to manufacture an integrated circuit embodying a device as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC. The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a device without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method at a first device for synchronising a first clock of the first device to a second clock of a second device, the method comprising:
   receiving a first message comprising an identifier from a third device;
   generating a first timestamp in dependence on the time at which the first message is received at the first device according to the first clock;
   receiving a second message from the second device comprising the identifier and a second timestamp, the second timestamp having been generated in dependence on the time at which the second device received the first message from the third device according to the second clock; and
   adjusting the first clock in dependence on a time difference between a time indicated by the first timestamp and a time indicated by the second timestamp.

2. The method as claimed in claim 1, further comprising the steps of:
   receiving a plurality of identifiers and storing each of the identifiers in memory;
   for each of the plurality of identifiers, storing in memory an associated timestamp indicating a time at which that identifier was received at the first device according to the first clock;
   in response to receiving the second message, searching the memory so as to identify a stored identifier that corresponds to the identifier in the second message and retrieving a timestamp stored in association with the stored identifier, wherein the retrieved timestamp is the first timestamp.

3. The method as claimed in claim 1, wherein the first message is broadcasted by the third device.

4. The method as claimed in claim 1, wherein the first and second clocks are clocks for timing of media playback.

5. The method as claimed in claim 1, further comprising:
   receiving media and a media playback time from the second device; and
   playing out the media in dependence on the media playback time according to the adjusted first clock.

6. The method as claimed in claim 5, wherein the media is received via the third device.

7. The method as claimed in claim 1, wherein the second message is transmitted to the second device via the third device.

8. The method as claimed in claim 1, wherein the identifier is generated in dependence on a third clock at the third device.

9. The method as claimed in claim 8, wherein the first clock is configured to operate to a first clock resolution and the third clock is configured to operate to a second resolution lower than the first resolution.

10. A method, at a first device comprising a first clock, of enabling synchronisation of a second clock at a second device with the first clock, the method comprising:
    receiving a first message comprising an identifier from a third device;
    generating a timestamp in dependence on the time at which the first message is received at the first device according to the first clock;
    generating a second message comprising the identifier and the generated timestamp; and
    transmitting the second message to the second device.

11. The method as claimed in claim 10, further comprising:
    determining a playback time for playing media in dependence on a time according to the first clock and an offset period of time; and
    transmitting the determined playback time to the second device.

12. The method as claimed in claim 11, wherein the playback time is transmitted to the second device via the third device.

13. The method as claimed in claim 10, wherein the second message is transmitted to the second device via the third device.

14. The method as claimed in claim 10, wherein the identifier is generated in dependence on a third clock at the third device.

15. The method as claimed in claim 14, wherein the first clock is configured to operate to a first clock resolution and the third clock is configured to operate to a second resolution lower than the first resolution.

16. The method as claimed in claim 10, wherein the third clock is a wireless interface clock for timing of wireless communications.

17. The method as claimed in claim 10, wherein the third device is an access point.

18. The method as claimed in claim 10, wherein the first device is configured to operate according to a WLAN standard and the identifier is a timing synchronisation function.

19. The method as claimed in claim 10, wherein the first device is a wireless speaker.

20. A system comprising a master device, a slave device and a third device, wherein the master device comprises:
    a first clock,
    a first communications interface configured to receive a first message comprising an identifier from the third device and generate a first timestamp in dependence on the time at which the first message is received at the master device according to the first clock, and
    a first controller configured to generate a second message comprising the identifier and the generated first timestamp, wherein the communications interface is further configured to transmit the second message to the slave device; and
    wherein the slave device comprises:
    a second clock,
    a second communication interface configured to:
        receive the first message comprising the identifier from the third device and generate a second timestamp in dependence on the time at which the first message is received at the slave device according to the second clock; and
        receive the second message from the master device, and
    a second controller configured to adjust the second clock in dependence on a time difference between a time indicated by the first timestamp and a time indicated by the second timestamp.

* * * * *